(No Model.) 2 Sheets—Sheet 1.

T. C. ROBINSON & R. STEPHENSON.
FEEDING MECHANISM FOR SEWING MACHINES.

No. 457,521. Patented Aug. 11, 1891.

WITNESSES:

INVENTOR:
Thos. C. Robinson
Richd. Stephenson (No Model.) 2 Sheets—Sheet 2.
T. C. ROBINSON & R. STEPHENSON.
FEEDING MECHANISM FOR SEWING MACHINES.
No. 457,521. Patented Aug. 11, 1891.
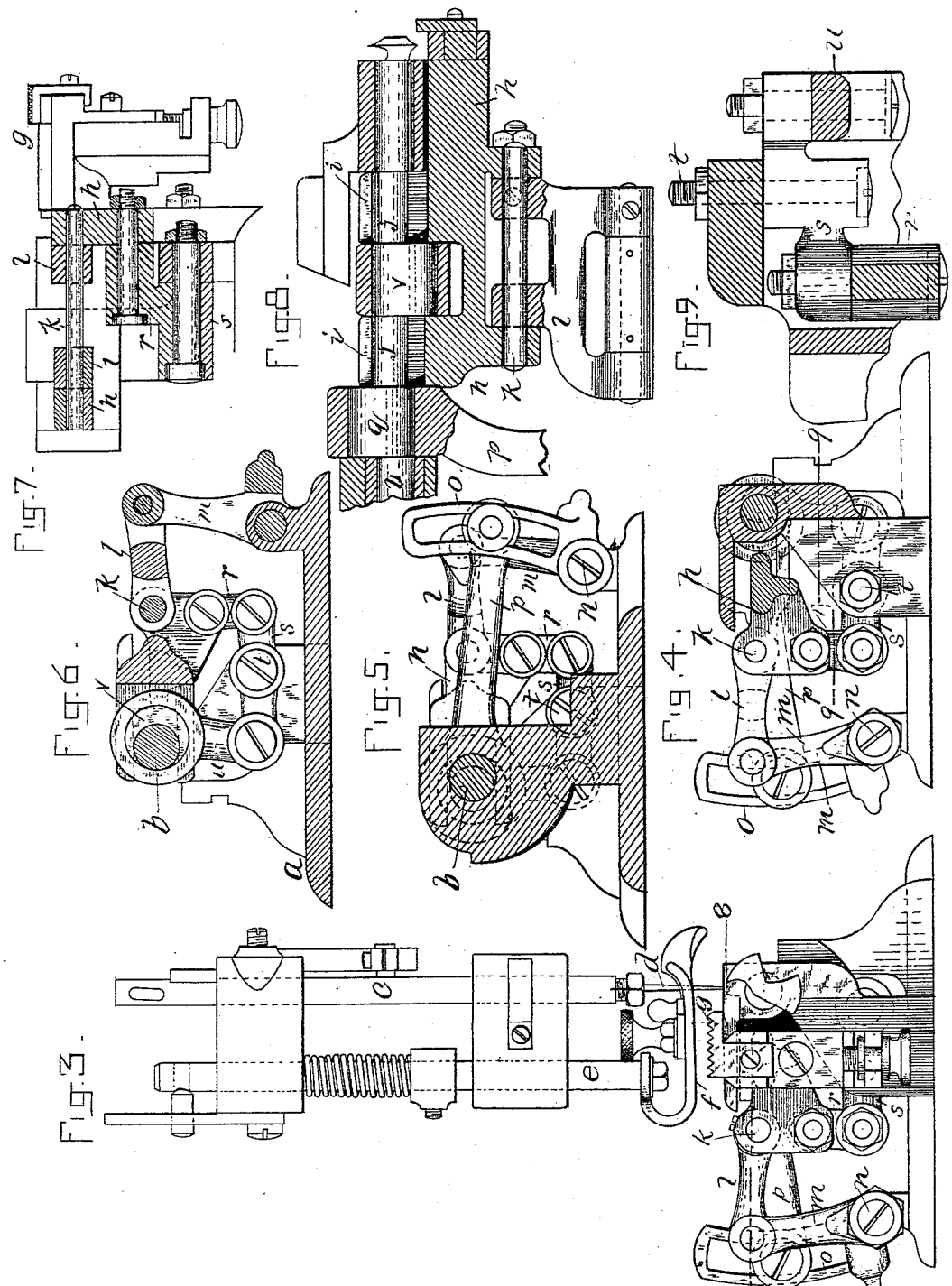
WITNESSES
INVENTOR

UNITED STATES PATENT OFFICE.

THOMAS C. ROBINSON AND RICHARD STEPHENSON, OF BOSTON, ASSIGNORS OF ONE-HALF TO JAMES H. TOMLINSON, OF LAWRENCE, AND E. B. WELCH, OF BOSTON, MASSACHUSETTS.

FEEDING MECHANISM FOR SEWING-MACHINES.

SPECIFICATION forming part of Letters Patent No. 457,521, dated August 11, 1891.

Application filed September 15, 1890. Serial No. 364,990. (No model.)

*To all whom it may concern:*

Be it known that we, THOMAS C. ROBINSON and RICHARD STEPHENSON, both of Boston, in the county of Suffolk and State of Massachusetts, have invented certain new and useful Improvements in Feed Mechanism for Sewing-Machines, of which the following is a specification.

Our invention has relation to sewing-machine feeds generally, and is particularly adapted for use as a "straw" on machines of the type or kind commonly known as "Wilcox & Gibbs" machines.

It is the purpose of our invention to provide a durable and efficient feed which shall be to all intents and purposes a "parallel motion" or "square four-motion" feed derived from a single rotary shaft.

Our invention consists of the improvements hereinafter described in detail, and pointed out with particularity in the claims.

Reference is to be had to the annexed drawings, and to the letters of reference marked thereon, forming a part of this specification, the same letters designating the same parts or features, as the case may be, wherever they occur.

Figure 1:
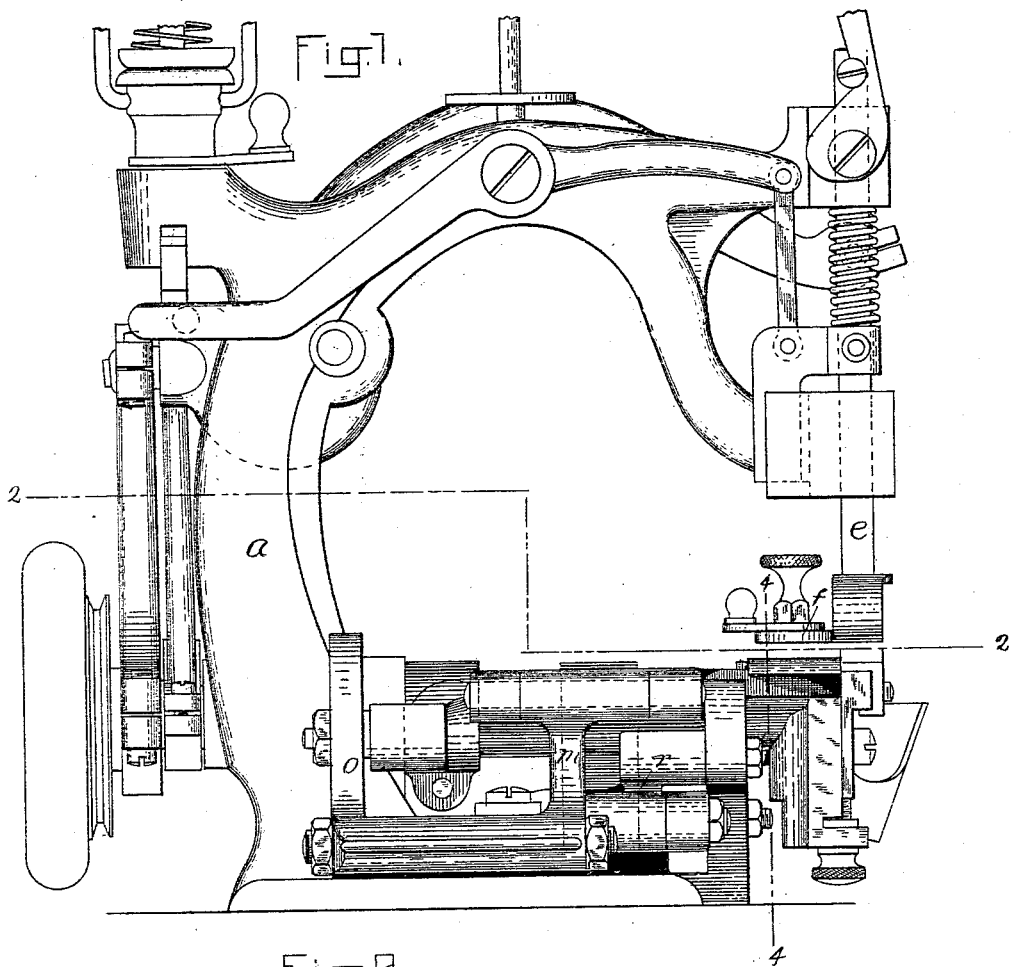
Figure 2:
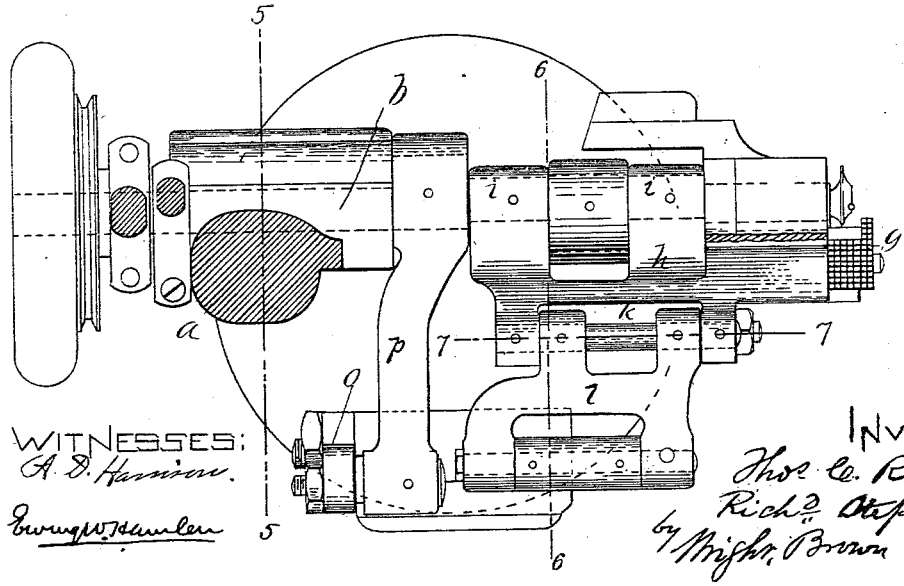

In the drawings, Figure 1 is a rear elevation of a sewing-machine of the Wilcox & Gibbs type equipped with our improvement. Fig. 2 is a sectional plan view of the same, the section being taken on the line 2 2 of Fig. 1. Fig. 3 is an end elevation of the feed end of the machine. Fig. 4 is a sectional view taken on the line 4 4 of Fig. 1. Fig. 5 is a sectional view taken on the line 5 5 of Fig. 2. Fig. 6 is a sectional view taken on the line 6 6 of Fig. 2. Fig. 7 is a sectional view taken on the line 7 7 of Fig. 2. Fig. 8 is a sectional detail taken on the line 8 8 of Fig. 3. Fig. 9 is a sectional detail taken on the line 9 9 of Fig. 4.

In the drawings, $a$ designates the machine-frame; $b$, (shown by dotted lines in Figs. 1 and 2,) the main or operating shaft; $c$, the needle-bar; $d$, the needle; $e$, the presser-bar; $f$, the presser-foot, and $g$ the feed-dog. The parts mentioned may be of common or suitable construction, and, as shown in the drawings, are combined with the necessary actuating and co-operative adjuncts to effect single-thread sewing.

The feed-dog $g$ is connected with the forward end of the frame $h$. The projections $i\ i$, comprising the front portion of the said frame, are slotted or forked, so as to embrace the eccentric portions $j\ j$ of the shaft $b$, whereby the said portion of the said frame may be raised and lowered. The rearward portion of the frame $h$ is jointed by means of a rod $k$ to the forward part of a frame $l$, the rearward part of which is pivotally connected with the upper end of a rocking frame $m$, fulcrumed on a rod $n$, having bearings in the machine-bed. To one end of the frame $m$ is connected a curved slotted arm $o$, in the slot of which arm there is adjustably connected one end of a pitman $p$, the opposite end of which embraces an eccentric $q$ on the main shaft $b$. The rear portion of the frame $h$ is pivotally connected through the medium of a link $r$ with an oscillating lever $s$, fulcrumed at $t$ to a stationary part of the machine at a point below the feed-dog $g$, the forward end of the said lever $s$ being pivotally connected to the lower end of a short pitman $u$, the upper end of which embraces an eccentric $v$ on main shaft $b$. It is to be noted that the frames $h$ and $l$ are so constructed and related as to operate in the nature of toggle-levers, so that the operation of eccentric $q$ upon the frame $h$ through the medium of pitman $p$, arm $o$, and frames $m$ and $k$ will have no effect by way of raising and lowering the feed-dog frame $h$, but merely move the said frame to and fro in parallel lines.

The raising and lowering of the feed-dog and its frame is effected by the eccentrics $j\ j$ and $v$, the former acting directly upon the forward end of the frame and the latter acting through the medium of pitman $u$, oscillating lever $s$, and link $r$ upon the rearward portion of the said frame, the construction and arrangement or timing of the parts being such as to effect the raising and lowering of both the forward and rear ends or parts of the frame in unison and in substantially parallel vertical lines, no horizontal or to-and-fro motion being effected by the said eccentrics $v$ and $j$.

By the construction and arrangement of parts as described we are enabled to secure a substantially square four-motion feed—that is, a movement of the feed-dog in substantially parallel, vertical, and horizontal lines—and that the bearings of the movable parts are broad and long, so that the wear of the parts will be inconsiderable and that the movements of the parts will be steady and certain.

It is to be observed that any known means for imparting a parallel to-and-fro motion to the feed may be employed in combination with the special means shown and described by us for giving the feed a parallel vertical motion, and vice versa.

It is manifest that changes may be made in the form and arrangement of parts comprising the invention without departing from the nature or spirit thereof.

Having thus explained the nature of the invention and described a way of constructing and using the same, we declare that what we claim is—

1. A feed mechanism for sewing-machines, consisting of the main shaft and eccentrics thereon, a feed-dog frame slotted at its forward end and engaged by certain of said eccentrics to impart a vertical motion thereto, an oscillatory lever, a link connecting the rear end thereof with the rear of the said frame, a pitman connected with the forward end of the said lever and engaged and operated by one of said eccentrics, and means for imparting a to-and-fro movement to the said frame, as set forth.

2. A feed mechanism for sewing-machines, consisting of the main shaft and an eccentric thereon, a feed-dog frame, a frame $l$, pivotally connected at its forward end with the rearward end of the feed-dog frame, a rocking frame pivotally connected at its upper end with the rearward end of the frame $l$, an arm $o$, connected with the rocking frame, a pitman $p$, engaged at one end by the said eccentric and pivotally connected at its opposite end with said arm $o$, and means for imparting a parallel vertical motion to the said feed-dog frame, as set forth.

3. A feed mechanism for sewing-machines, consisting of the main shaft and eccentrics thereon, a feed-dog frame engaged at its forward end by certain of said eccentrics, an oscillating lever, a link connecting the rear end thereof with the rear end of said frame, a pitman connected with the forward end of said lever and engaged and operated by one of said eccentrics, a frame $l$, pivotally connected with the feed-dog frame, a rocking frame pivotally connected with the frame $l$, an arm connected with the rocking frame, and a pitman engaged at one end by an eccentric on the main shaft and pivotally connected at its opposite end with said arm, as set forth.

In testimony whereof we have signed our names to this specification, in the presence of two subscribing witnesses, this 9th day of August, A. D. 1890.

THOMAS C. ROBINSON.
RICHARD STEPHENSON.

Witnesses:
  ARTHUR W. CROSSLEY,
  A. D. HARRISON.